United States Patent [19]
Polczynski

[11] Patent Number: 5,910,731
[45] Date of Patent: Jun. 8, 1999

[54] FRONT END INTERFACE CIRCUIT AND METHOD OF TUNING THE SAME

[75] Inventor: Christopher Polczynski, Petaluma, Calif.

[73] Assignee: Alcatel USA Sourcing, L.P., Plano, Tex.

[21] Appl. No.: 08/967,954

[22] Filed: Nov. 12, 1997

[51] Int. Cl.$^6$ .................................................. H03K 17/16
[52] U.S. Cl. .............................................. 326/30; 375/257
[58] Field of Search ................................ 326/30, 82, 86, 326/89; 375/257

[56] References Cited

U.S. PATENT DOCUMENTS

| | | | |
|---|---|---|---|
| 5,134,311 | 7/1992 | Biber et al. | 326/30 |
| 5,374,861 | 12/1994 | Kubista | 326/30 |
| 5,604,450 | 2/1997 | Borkar et al. | 326/30 |

OTHER PUBLICATIONS

Harman et al., "Local Distribution for IMTV," *IEEE Multimedia*, vol. 2, No. 3, IEEE Computer Society, Fall 1995, pp. 14–22.

"LUCV5002 Dual Video Operational Amplifier," *Preliminary Data Sheet*, Lucent Technologies, Jan. 1997, pp. 1–20.

"LUCV5006 Dual Video Operational Amplifier," *Preliminary Data Sheet*, Lucent Technologies, Jan. 1997, pp. 1–20.

*Primary Examiner*—Jon Santamauro
*Assistant Examiner*—Don Phu Le
*Attorney, Agent, or Firm*—Fliesler, Dubb, Meyer & Lovejoy

[57] ABSTRACT

An automatic impedance matching front end interface circuit includes a processor and a plurality of variable resistors, the resistances of which are adjustable by the processor to achieve impedance matching such that the upstream and downstream signals flow in desired directions. A method of adjusting the resistances of the variable resistors includes measuring two voltages at different locations along a downstream transmission line, obtaining a measured voltage ratio, comparing the measured ratio to an optimal ratio, and adjusting the resistances of the variable resistors to cause the measured ratio to approach the optimal ratio.

57 Claims, 3 Drawing Sheets

FRONT END INTERFACE CIRCUIT AND METHOD OF TUNING THE SAME

BACKGROUND OF THE INVENTION

1. Field of the Invention

The present invention relates to a front end interface circuit for a communications network, and more particularly, to an automatic impedance matching circuit for separating upstream and downstream signals in the network.

2. Background

The telecommunications industry has developed analog receiver front end circuits that are used for separating the flows of upstream and downstream signals in digital two-way communications networks, and more particularly, to SDV networks. The analog front end circuit, also called an interface circuit, is typically a three-port device that has a downstream input, a downstream output which also serves as an upstream input, and an upstream output that is different from the downstream input. Conventional interface circuits typically include diplexers, active hybrids and passive hybrids. These interface circuits are implemented in optical network units (ONU) in fiber-to-the-curb (FTTC) architectures, described in *Harman,* et al., "Local Distribution for IMTV," *IEEE Multimedia,* Vol. 2, No. 3, IEEE Computer Society, Fall 1995, incorporated herein by reference.

Both active and passive hybrid circuits require resistor value tuning in the radio frequency (RF) signal path in order to match the impedance of the downstream input transmission line to that of the output downstream transmission line, which is typically an unshielded twisted pair (UTP). The output downstream transmission line is connected to a receiver, which is typically at a customer's site that could be thousands of feet away from the analog front end interface circuit. A typical receiver at the downstream output includes a Lucent Technologies T7665 quadrature phase shift keying (QPSK) receiver, which is implemented on a monolithic integrated circuit (IC). The T7665 IC is able to receive downstream signals from either a twisted pair or a coaxial transmission line, although a UTP transmission line is typically used. Without resistor value tuning in the downstream RF signal path in the active hybrid or passive hybrid circuit to match the UTP line impedance, the specification for out-of-band signal attenuation, which is typically on the order of 75 dB, may not be met. Although manual tuning of resistors is acceptable for experimental or non-production circuits, it is generally not acceptable for production units due to expensive and cumbersome tuning processes. Therefore, neither the active hybrid circuits nor the passive hybrid circuits are feasible for commercially competitive large-scale production. Therefore, there is a need for a front end interface circuit that obviates the necessity of manual resistor value tuning.

A diplexer is basically a three-port circuit with an input port and two output ports, each output port connected to a bandpass filter with a different passband. A diplexer circuit does not require resistor value tuning. However, since an analog front end circuit for a digital interactive network usually has stringent out-of-band signal attenuation specifications, which are typically on the order of 75 dB, the diplexer requires complicated bandpass filter designs. Therefore, there is a further need for a front end interface circuit without stringent specifications for bandpass filters.

SUMMARY OF THE INVENTION

In view of the above problems, the present invention is able to provide a front end interface circuit that automatically matches the line impedance of the output downstream transmission line with that of the input downstream transmission line by microprocessor-controlled automatic resistor value tuning. When the circuit is impedance matched, the downstream signal is transmitted from the input downstream transmission line to the output downstream transmission line with nearly no leakage of the downstream signal at the upstream output, and the upstream signal is transmitted from the upstream input, which is the same as the downstream output, to the upstream output with nearly no leakage to the downstream input. The automatic impedance matching circuit roughly comprises:

(a) an input downstream transmission line including a first portion and a second portion, the input downstream transmission line adapted to convey a downstream signal;

(b) an output downstream transmission line coupled to the input downstream transmission line, the output downstream transmission line adapted to convey the downstream signal and an upstream signal in a direction opposite that of the downstream signal;

(c) a plurality of variable serial resistors connected between the first and second portions of the input downstream transmission line;

(d) an upstream signal directing circuit coupled to the input downstream transmission line, the upstream signal directing circuit including a plurality of variable input resistors; and (e) a processor connected to adjust the variable serial resistors and the variable input resistors.

In an embodiment, the upstream signal directing circuit further includes:

(i) a first operational amplifier including a non-inverting input, an inverting input, and an output;

(ii) a second operational amplifier including a non-inverting input, an inverting input, and an output, the outputs of the first and second operational amplifiers forming an output of the upstream signal, wherein the plurality of variable input resistors are connected between the operational amplifiers and the input downstream transmission line.

The present invention further provides a method of adjusting the variable resistors in the impedance matching circuit, roughly comprising the steps of:

(a) measuring a first voltage on the first portion of the input downstream transmission line;

(b) measuring a second voltage on the second portion of the input downstream transmission line; and (c) adjusting the variable serial resistors and the variable input resistors in response to the measured first and second voltages.

Advantageously, the circuit according to the present invention obviates the need for manual tuning of variable resistors to match the impedance of the output downstream transmission line. A further advantage of the invention is that it obviates the need for complicated filters to meet the stringent requirements for separating the upstream and downstream signals.

BRIEF DESCRIPTION OF THE DRAWINGS

The invention will be described with respect to particular embodiments thereof, and references will be made to the drawings in which.

DETAILED DESCRIPTION

Figure 1:
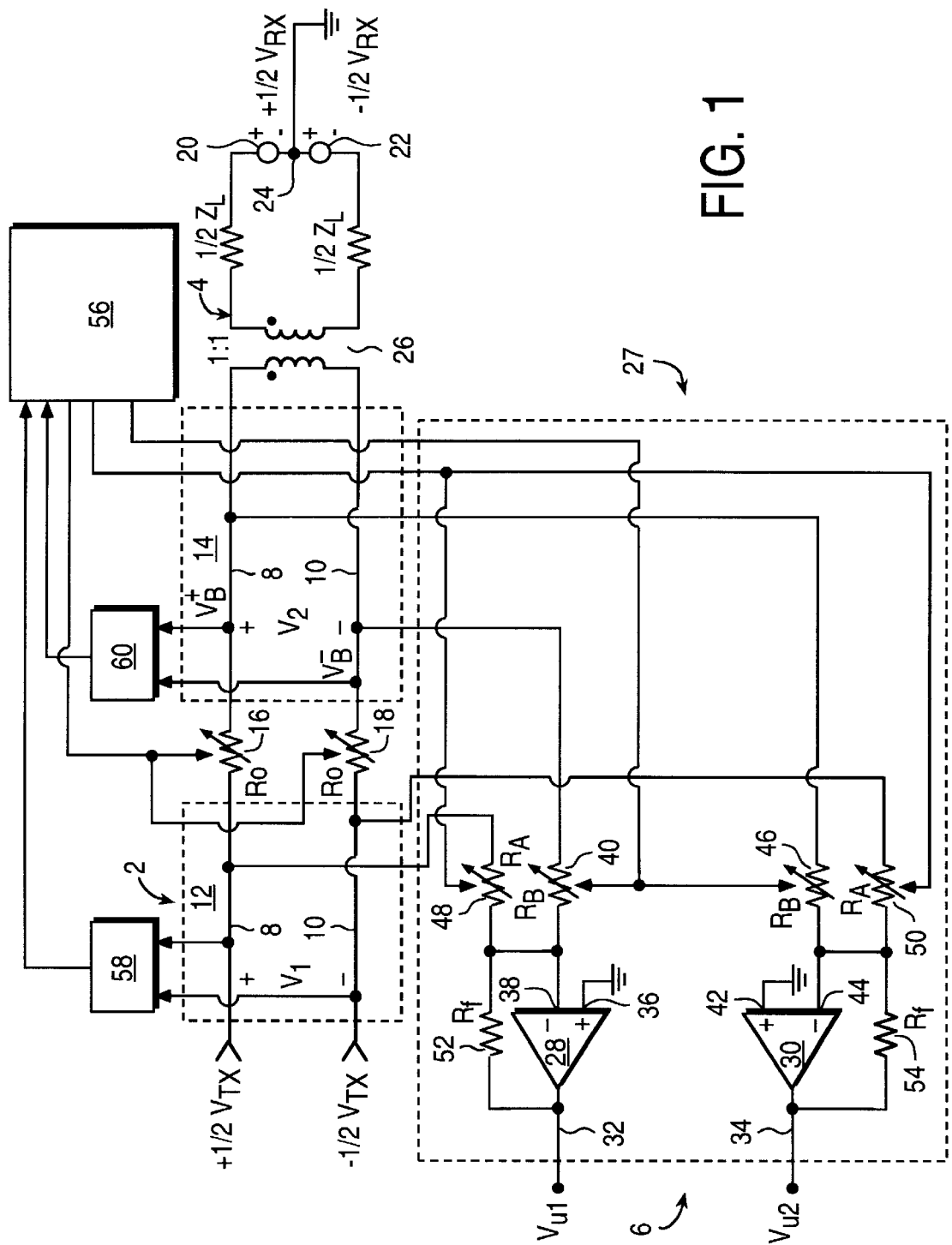
FIG. 1 is a diagram of a front end interface circuit in accordance with the present invention.

FIG. 1 shows a circuit diagram of the front end interface circuit according to the present invention, with an input downstream transmission line 2, an output downstream transmission line 4, and an upstream signal output 6. The input downstream transmission line 2 comprises a first line 8 and a second line 10, and is divided into a first portion 12 and a second portion 14 with both the first line 8 and the second line 10 in each of the two portions 12 and 14. For the convenience of presentation in this description, the input downstream signal is represented as having a voltage component $+\frac{1}{2}V_{Tx}$ that is carried by the first line 8 in the first portion 12 of the input downstream transmission line 2 and a second voltage component $-\frac{1}{2}V_{Tx}$ in the second line 10 in the first portion 12 of the downstream transmission line 2. In actual operation of the circuit, the voltages provided to the first and second lines 8 and 10 need not be anti-symmetric.

The first and second lines 8 and 10 in the second portion 14 of the input downstream transmission line 2 are connected to the first and second lines 8 and 10 in the first portion 12 through a pair of variable serial resistors 16 and 18, respectively. Furthermore, for the convenience of presentation, the output downstream transmission line 4, which can be an unshielded twisted pair (UTP), has a line impedance Of $\frac{1}{2}Z_L$ on each of the two lines in the pair. The impedance $Z_L$ represents the line impedance of the output downstream transmission line 4, which is connected to a load such as a receiver having a load impedance $Z_L$. The output downstream transmission line 4, which also serves as an input upstream transmission line for the transmission of upstream signals, is usually also terminated by an upstream signal transmitter represented by voltage sources 20 and 22, which generate voltages $+\frac{1}{2}V_{Rx}$ and $-\frac{1}{2}V_{Rx}$, respectively. For the purpose of symmetry in representing the load impedance and the signal voltage carried by the output downstream transmission line 4, one-half of the load impedance $Z_L$ and one-half of the voltage $V_{Rx}$ are assigned to each of the two lines in the output downstream transmission line 4. A node 24 connecting the voltage sources 20 and 22 is grounded.

In an embodiment, the output downstream transmission line 4 is coupled to the input downstream transmission line 2 through a voltage transformer 26, with a winding ratio of 1:1. The purpose of the transformer 26 is to isolate the currents in the input downstream transmission line 2 from the output downstream transmission line 4. The upstream signal at the upstream output 6 is characterized by the difference between upstream output voltages $V_{U1}$ and $V_{U2}$.

An upstream signal directing circuit 27 is coupled to the input downstream transmission line 2 to direct the upstream signal to the upstream output 6. In an embodiment, the upstream signal directing circuit 27 includes a pair of operational amplifiers 28 and 30 having outputs 32 and 34 for generating the voltages $V_{U1}$ and $V_{U2}$, respectively. The first operational amplifier 28 has a grounded non-inverting input 36 and an inverting input 38 connected through a first variable input resistor 40 to the second line 10 in the second portion 14 of the input downstream transmission line 2. The second operational amplifier 30 has a grounded non-inverting input 42 and an inverting input 44 connected through a second variable input resistor 46 to the first line 8 in the second portion 14 of the input downstream transmission line 2. Examples of the first and second operational amplifiers 28 and 30 suitable for switched digital video (SDV) network applications include Lucent Technologies LUCV5002 and LUCV 5006 Dual Video Operational Amplifiers, both of which have a gain flatness of less than 1 dB from DC to 30 MHZ, according to Lucent Technologies' *Preliminary Data Sheet,* January 1997, incorporated herein by reference.

In a further embodiment, the inverting input 38 of the first operational amplifier 28 is also connected through a third variable input resistor 48 to the first line 8 in the first portion 12 of the input downstream transmission line 2. In a similar manner, the inverting input 44 of the second operational amplifier 30 is connected through a fourth input variable resistor 50 to the second line 10 in the first portion 12 of the input downstream transmission line 2. In an additional embodiment, two fixed feedback resistors 52 and 54 are connected between the outputs 32, 34 and the inverting inputs 38, 44 of the first and second operational amplifiers 28 and 30, respectively, to provide a gain stabilization at the outputs of the operational amplifiers 28 and 30. For example, the feedback resistors 52 and 54 can have a fixed resistance RF on the order of 100Ω.

A microprocessor 56 is provided to adjust the variable serial resistors 16, 18 and the variable input resistors 40, 46, 48 and 50. For the convenience of adjustment, the variable serial resistors 16 and 18 can be set to the same resistance $R_0$ at all times. The first and second variable input resistors 40 and 46 are adjusted to the same resistance value $R_B$ according to a predetermined relationship with the resistance $R_0$, the relationship of which is described below. Furthermore, the resistances of the third and fourth variable input resistors 48 and 50 can be set to the same value $R_A$ by the processor 56, in a predetermined relationship with the resistance values $R_0$ and $R_B$, the relationship of which is described below. A first voltage sensor 58 is connected to measure the voltage difference $V_1$ between the first line 8 and the second line 10 in the first portion 12 of the input downstream transmission line 2, and provides a digitized measured voltage to the processor 56, which typically includes a computer with a microprocessor and a memory storage. A second voltage sensor 60 is connected to measure the voltage difference $V_2$ between the first line 8 and the second line 10 in the second portion 14 of the input downstream transmission line 2. Since the voltage carried by the first line 8 in the first portion 12 is $\frac{1}{2}V_{Tx}$ and the voltage carried by the second line 10 in the first portion 12 is $-\frac{1}{2}V_{Tx}$, the voltage $V_1$ is equal to $V_{Tx}$. The voltage on the first line 8 in the second portion 14 of the input downstream transmission line 2 is designated as $V_B^+$ and the voltage on the second line 10 in the second portion 14 of the input downstream transmission line 2 is designated as $V_B^-$. The voltage $V_2$ is thus equal to $V_B^+ - V_B^-$. The measured first and second voltages which are digitized by the voltage sensors 58 and 60 are read into the processor 56, which in response generates control signals to adjust the variable resistors 16, 18, 40, 46, 48 and 50. The voltage sensors 58 and 60 should be able to measure voltages at the frequencies of the upstream and downstream RF signals. For example, in a typical switched digital video (SDV) network, the downstream RF signal has a frequency of about 6–26 MHZ and the upstream RF signal has a frequency of about 1.6 MHZ.

For the SDV network, examples of the voltage sensors 58 and 60 that are adapted to measure voltages at these frequencies include peak detectors which output the measured voltages in a digital format. The purpose of impedance matching between the input downstream transmission line 2 and the output downstream transmission line 4 is to cancel the downstream signal at the upstream output 6, that is, to cancel the downstream voltages at the outputs 32 and 34 of the first and the second operational amplifiers 28 and 30, respectively. The following relationships are required for the impedance matching:

$$R_0 + R_B = \frac{2R_0 R_B}{Z_L} \quad (1)$$

$$\frac{1}{R_A} = \frac{Z_L}{4R_0 R_B} = \frac{1}{2(R_0 + R_B)}$$

Moreover, when $V_{Rx}$ is set to 0 V, the following equation applies:

$$\frac{V_2}{V_1} = \frac{V_B^+ - V_B^-}{V_{Tx}} = \frac{0.5 Z_L R_B}{R_0(0.5 Z_L + R_B) + 0.5 Z_L R_B} \quad (3)$$

Since the value of the output line impedance $Z_L$ is fixed and the first and second voltages $V_1$ and $V_2$ can be measured by the voltage sensors 58 and 60, respectively, the resistance value $R_B$ of the first and the second variable input resistors 40 and 46 can be determined by Equation (3). $V_{Rx}$ can be set to 0 V by a simple method such as eliminating the upstream signal transmission at a customer's site while maintaining the load impedance $Z_L$ of the receiver. Furthermore, the resistance value $R_B$ can be set to a fixed multiple of the resistance value $R_0$. As an illustrative example, when the load impedance $Z_L$ is 100Ω and the resistance value $R_B$ is set at 10 times the resistance value $R_0$, it follows from Equations (1) and (3) that:

$$\frac{V_2}{V_1} = \frac{5}{11} \approx 0.4545 \quad (4)$$

The automatic impedance matching circuit of the present invention measures the ratio $V_2/V_1$ and in response adjusts the resistance values of the variable resistors 16, 18, 40, 46, 48 and 50 to the desired values of $R_0$, $R_B$ and $R_A$ computed by the processor 56 according to the above equations. The objectives of adjusting the resistance values are to match the impedance of the input downstream transmission line 2 to that of the output downstream transmission line 4 such that the downstream signal is not reflected in a direction opposite the downstream flow, and in addition, to cancel the downstream signal at the upstream signal output 6. In many practical applications, an exact impedance match is not necessary. For example, in a typical SDV application in which the output downstream transmission line 4 is a UTP with a line impedance $Z_L$ in the range of 85Ω to 115Ω, error limits can be set at about ±7.5% of the optimal ratio.

The voltage sources 20 and 22 generating the voltage $V_{Rx}$ should be set to 0 V during impedance matching. Initially, $V_{Rx}$ can be forced to 0 V upon power up or during line provisioning, and a downstream signal with a voltage of $V_{Tx}$ at a frequency in the range of about 6 to 26 MHZ is injected into the first portion 12 of the input downstream transmission line 2. Some interactive network transmitter chip sets, for example the Lucent Technologies T7664 transmitter IC, automatically provide the downstream signal upon power up.

Figure 2:
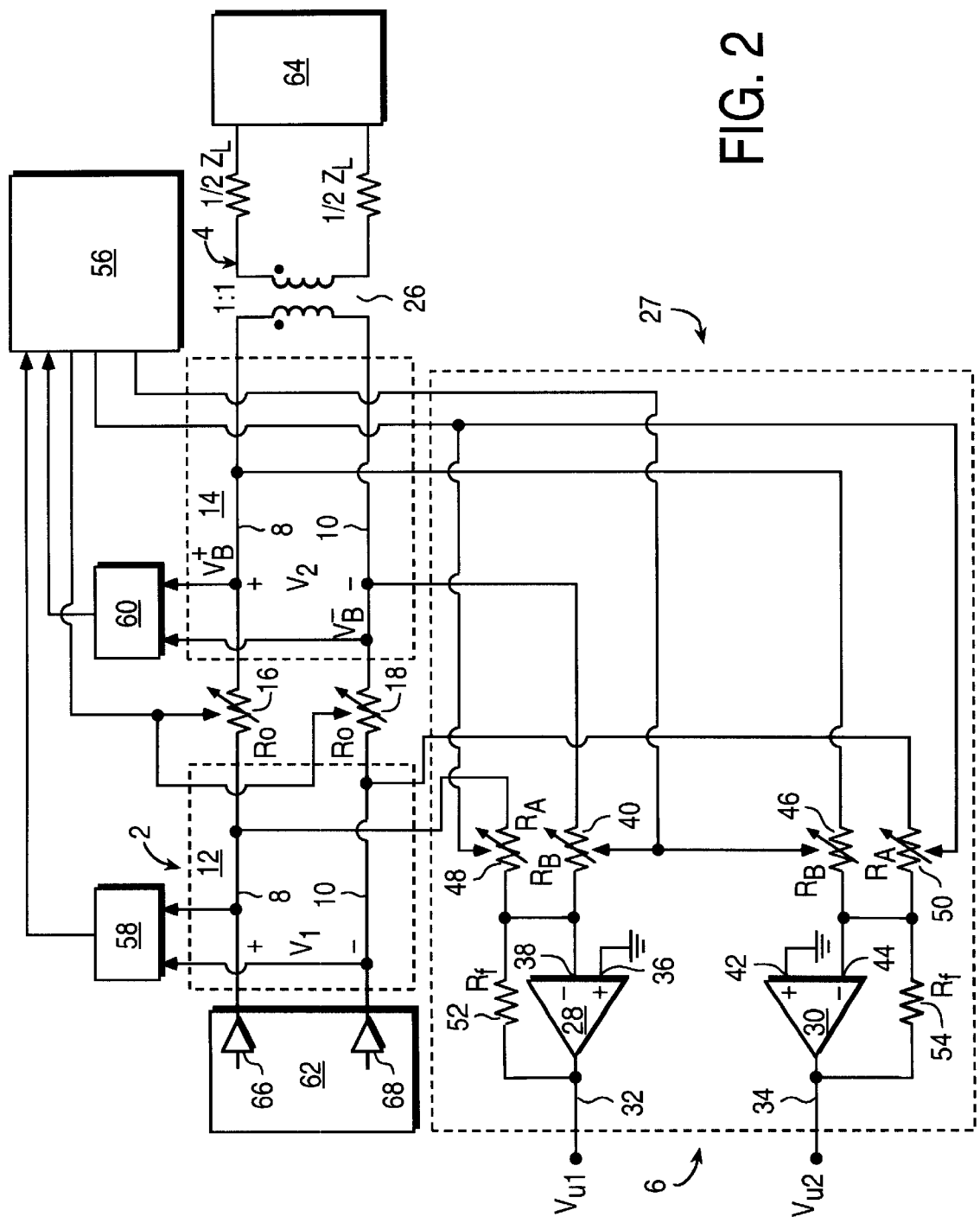
FIG. 2 is a circuit diagram including the front end interface circuit of FIG. 1 with the upstream input connected to a digital interactive network transmitter and the downstream output connected to a digital interactive network receiver.

FIG. 2 shows the automatic impedance matching interface circuit of FIG. 1 with the input downstream transmission line 2 connected to an interactive network transmitter, an example of which is the Lucent Technologies T7664 IC 62, and the output downstream transmission line 4 connected to a receiver 64, an example of which is the Lucent Technologies T7665 QPSK receiver. The transmitter 62 provides two input operational amplifiers 66 and 68 connected to the first and second lines 8 and 10, respectively, in the first portion 12 of the input downstream transmission line 2. Because of very high input impedances and very low output impedances of the operational amplifiers 66 and 68, the upstream signal from the output downstream transmission line 4 flows to the upstream signal output 6 instead of the downstream transmitter 62. The variable serial resistors 16 and 18 and the variable input resistors 40, 46, 48 and 50 can be of various types, such as electromechanical relay switched resistors or solid state switched resistors. If the circuit is to be implemented on a printed circuit board (PCB) with discrete components, electromechanical relay switched resistors can be used as the variable resistors 16, 18, 40, 46, 48 and 50. If the circuit is to be implemented on a monolithic IC chip, solid state switched resistors may be used as variable resistors. However, since solid state switches are linear only within an operating region of small signal amplitudes, the solid state switched resistors would exhibit nonlinear characteristics, which may be undesirable, when the amplitude of the downstream signal is large, and thus should be taken into account in the design.

In an embodiment, the processor 56 stores the predetermined optimal ratio of $V_2/V_1$ in its memory storage. Since an exact match is not necessary and the accuracy of the first and second voltage sensors 58 and 60 is subject to uncertainties, a predetermined error limit can be stored in the processor 56 such that impedance matching is achieved if the measured ratio of $V_2/V_1$ is within the error limit of the optimal ratio. For example, with an output downstream transmission line 4 having a UTP configuration with an impedance $Z_L$ of 100Ω±15%, that is, in the range of about 85Ω to 115Ω, an error limit within ±7.5% of the optimal ratio is typically considered acceptable. For an optimal ratio of 0.4545 as given in Equation (4), impedance matching is considered to be accomplished when the measured voltage ratio $V_2/V_1$ is within the range of about 0.4205 to about 0.4886.

Equation (3) can be reduced to an equation with a single variable of either $R_B$ or $R_0$ when the load impedance $Z_L$ and the optimal ratio of $V_2/V_1$ are known and $R_B$ is set to equal a multiple of $R_0$. For example, assuming that $R_B=10\ R_0$, $Z_L=100Ω$, and $V_2/V_1=5/11\approx0.4545$, the desired values of $R_0$ and $R_B$ should be 55Ω and 550Ω, respectively.

The relationship of $R_A$ to $R_B$ and $R_0$ can be derived from Equation (2), which is simply the following:

$$R_A = 2(R_0 + R_B) \quad (5)$$

When $R_B=10\ R_0$, then $R_A$ is simply 22 $R_0$. In the above example, the desired value of $R_A$ should be 1,210Ω.

The present invention also provides a method of automatically adjusting the resistance values $R_0$, $R_B$ and $R_A$ in the circuits of FIGS. 1 and 2. The method roughly comprises the steps of measuring the first voltage $V_1$ and the second voltage $V_2$, dividing the second voltage by the first voltage to obtain a measured ratio of the second voltage to the first voltage, determining if the measured ratio is within a predetermined error limit of an optimal ratio, and adjusting the resistance $R_0$ of the variable serial resistors 16 and 18, the resistance $R_B$ of the first and the second variable input resistors 40 and 46, and the resistance $R_A$ of the third and fourth variable input resistors 48 and 50, if the measured ratio is outside the error limit of the optimal ratio. If the measured ratio is within the error limit of the optimal ratio, then no adjustments to the variable resistors 16, 18, 40, 46, 48 and 50 are necessary.

Figure 3:
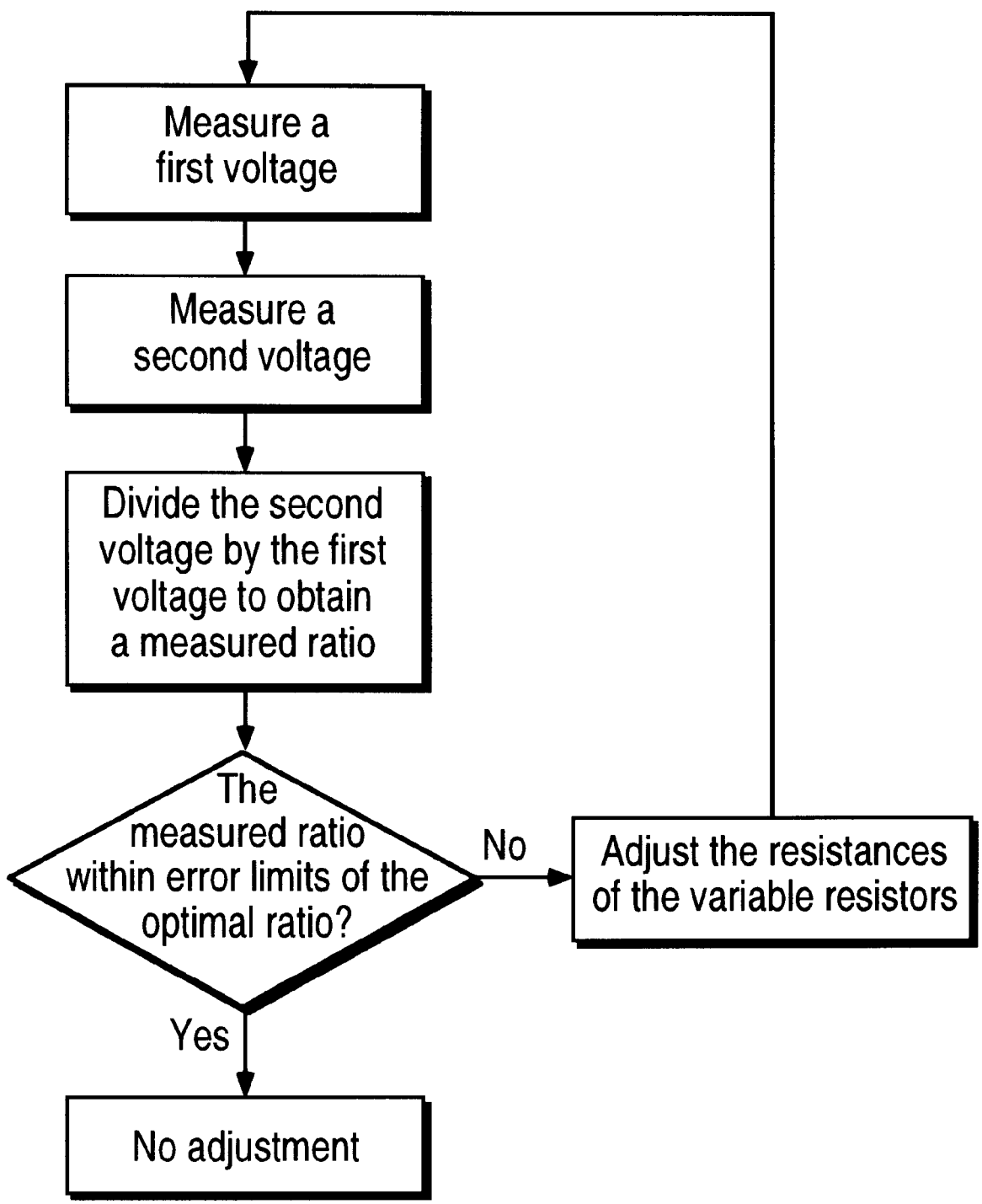
FIG. 3 is a flowchart showing the process flow of a method of tuning the variable resistors in the circuits of FIGS. 1 and 2 according to the present invention.

After adjusting the resistances of the variable resistors 16, 18, 40, 46, 48 and 50, the first and the second voltages are measured again by the first and the second voltage sensors 58 and 50, respectively, and the ratio of the measured second voltage to the first voltage is compared against the optimal ratio to determine whether it is within the error limit, and further adjustments are made to the variable resistors 16, 18, 40, 46, 48 and 50 if the measured ratio is still outside the error limit of the optimal ratio. The resistances of the variable resistors can be adjusted in multiple iterations until the measured ratio is within the error limit of the optimal ratio. The method is illustrated in the simplified flowchart of FIG. 3.

In an embodiment, the resistances of the variable resistors 16, 18, 40, 46, 48 and 50 are adjusted by changing the resistance $R_0$ by a fixed amount which is usually a small increment, and by changing the resistances $R_B$ and $R_A$ according to their predetermined relationships with $R_0$, given by Equations (1)–(5) stated above. The first voltage $V_1$ is measured by the first voltage sensor 58 and the second voltage $V_2$ is measured by the second voltage sensor 60. The processor 56 then divides the second voltage by the first voltage to obtain a second measured ratio $V_2/V_1$ and determines if this ratio is within the error limit of the optimal ratio stored in the memory storage of the processor 56. If the second measured ratio $V_2/V_1$ is still outside the error limit of the optimal ratio, the resistances $R_0$, $R_B$ and $R_A$ are further adjusted until the measured ratio $V_2/V_1$ is close enough to the optimal ratio, that is, within its error limit. If a small increment in the resistance $R_0$ causes a measured ratio $V_2/V_1$ to depart further from the optimal ratio, then the resistance $R_0$ is changed by a small decrement to cause the measured ratio to move closer to the optimal ratio.

The resistance $R_A$ is determined by the relationship to $R_0$ and $R_B$ according to Equation (5) above. In the illustrative example in which $Z_L=100\Omega$ and $R_B=10 R_0$, described above, the optimal ratio of $V_2/V_1$ is equal to 5/11, which is approximately 0.4545, a number which is stored in the processor 56. During the resistor value adjustment process, the upstream signal voltage $V_{Rx}$ at the downstream output is set to 0 V at all times, thus eliminating the upstream signal.

In an alternate embodiment, the processor 56 stores a look-up table including sets of desired values of the resistances $R_0$, $R_B$ and $R_A$ for different optimal ratios, which depend upon the downstream output transmission line impedance $Z_L$, the relationship of $R_0$ to $R_B$, and Equation (3). In the illustrative example given above in which the line impedance $Z_L$ is $100\Omega$, $R_B$ is set to equal 10 $R_0$ and the optimal ratio $V_2/V_1$ is 5/11, the desired values of the resistances $R_0$, $R_B$ and $R_A$ are $55\Omega$, $550\Omega$, and $1,210\Omega$, respectively. In this embodiment, the upstream signal should also be eliminated, that is, the voltage $V_{Rx}$ should be forced to 0 V, during the resistor value adjustment process.

In the embodiments described above, a number of assumptions were made in order to simplify the analysis and the calculations. For example, it was assumed that $V_{Rx}$ equals 0 during the adjustments of the resistors. It was also assumed that the winding ratio of the transformer 26 was 1:1, that both resistors 16 and 18 were to be set to the same value, that both resistors 48 and 50 were to be set to the same value, that both resistors 40 and 46 are to be set to the same value, and that $R_0$, $R_A$ and $R_B$ bear certain fixed relationships to each other. None of these assumptions are mandatory in a different embodiment. It will be appreciated that similar equations can be developed which take each of these parameters into account, to the extent that an embodiment deviates from these assumptions. The principles of the invention would nonetheless still apply.

The invention has been described with respect to particular embodiments thereof, and numerous modifications can be made which are within the scope of the invention as set forth in the claims. For example, whereas the embodiments described herein involve differential signals, it will be appreciated that the principles of the invention can be used also with single-ended signals.

What is claimed is:

1. A circuit, comprising:

(a) an input downstream transmission line including a first portion and a second portion, the input downstream transmission line adapted to convey a downstream signal;

(b) an output downstream transmission line coupled to the input downstream transmission line, the output downstream transmission line adapted to convey the downstream signal received from the input downstream transmission line and an upstream signal in a direction opposite that of the downstream signal;

(c) a plurality of variable serial resistors connected between the first and second portions of the input downstream transmission line;

(d) an upstream signal directing circuit coupled to the input downstream transmission line, the upstream signal directing circuit including a plurality of variable input resistors; and (e) a processor connected to adjust the variable serial resistors and the variable input resistors.

2. The circuit of claim 1, wherein the upstream signal directing circuit further includes a plurality of operational amplifiers connected to the plurality of variable input resistors.

3. The circuit of claim 1, wherein the input downstream transmission line comprises a first line and a second line in each of the first and second portions, and the upstream signal directing circuit further includes:

(i) a first operational amplifier including a non-inverting input, an inverting input, and an output;

(ii) a second operational amplifier including a non-inverting input, an inverting input, and an output, the outputs of the first and second operational amplifiers forming an output of the upstream signal, wherein the plurality of variable input resistors are connected between the operational amplifiers and the input downstream transmission line.

4. The circuit of claim 3, wherein the plurality of variable input resistors comprise:

(i) a first variable input resistor, having a resistance $R_B$, connected between the inverting input of the first operational amplifier and the second line in the second portion;

(ii) a second variable input resistor, having the resistance $R_B$, connected between the inverting input of the second operational amplifier and the first line in the second portion.

5. The circuit of claim 4, further comprising:
(a) a third variable input resistor, having a resistance $R_A$, connected between the inverting input of the first operational amplifier and the first line in the first portion; and
(b) a fourth variable input resistor, having the resistance $R_A$, connected between the inverting input of the second operational amplifier and the second line in the first portion.

6. The circuit of claim 5, further comprising:
(a) a first feedback resistor connected between the output and the inverting input of the first operational amplifier; and
(b) a second feedback resistor connected between the output and the inverting input of the second operational amplifier.

7. The circuit of claim 3, wherein the processor is connected to read a first voltage between the first and second lines in the first portion and a second voltage between the first and second lines in the second portion, to obtain a measured ratio of the second voltage to the first voltage, and in response to the measured ratio, to adjust the variable serial resistors and the variable input resistors such that the measured ratio approaches an optimal ratio.

8. The circuit of claim 7, further comprising:
(a) a first voltage sensor connected to measure the first voltage between the first and second lines in the first portion; and
(b) a second voltage sensor connected to measure the second voltage between the first and second lines in the second portion, the first and second voltage sensors connected to transmit the measured first and second voltages to the processor, respectively.

9. The circuit of claim 1, further comprising a transformer that couples the input downstream transmission line to the output downstream transmission line.

10. A method of impedance matching in a circuit that comprises an input downstream transmission line including a first portion and a second portion connected by a plurality of variable serial resistors, an output downstream transmission line coupled to the input downstream transmission line, and an upstream signal directing circuit coupled to the input downstream transmission line, the upstream signal directing circuit including a plurality of variable input resistors, the method comprising the steps of:
(a) measuring a first voltage on the first portion of the input downstream transmission line;
(b) measuring a second voltage on the second portion of the input downstream transmission line; and
(c) adjusting the variable serial resistors and the variable input resistors in response to the measured first and second voltages.

11. The method of claim 10, further comprising the steps of:
(a) dividing the second voltage by the first voltage to obtain a measured ratio of the second voltage to the first voltage; and
(b) determining if the measured ratio is within a predetermined error limit of an optimal ratio.

12. The method of claim 11, wherein the step of adjusting the variable serial resistors and the variable input resistors comprises the steps of:
(i) adjusting the variable serial resistors by a fixed amount;
(ii) adjusting the variable input resistors according to predetermined relationships with the variable serial resistors;
(iii) measuring the first voltage;
(iv) measuring the second voltage;
(v) obtaining a second measured ratio of the second voltage to the first voltage;
(vi) determining if the second measured ratio is within the predetermined error limit of the optimal ratio; and
(vii) repeating steps (i) through (vi) if the second measured ratio is without the predetermined error limit of the optimal ratio.

13. An automatic impedance matching circuit for separating flow of upstream and downstream signals, comprising:
(a) an input downstream transmission line, divided into a first portion and a second portion, comprising a first line and a second line in each of the first and second portions, the input downstream transmission line adapted to convey a downstream signal;
(b) a pair of variable serial resistors, each having a resistance $R_0$, connected in series between the first and second portions of the first and second lines, respectively;
(c) an output downstream transmission line coupled to the second portion of the input downstream transmission line, the output downstream transmission line characterized by a line impedance $Z_L$ and adapted to convey an upstream signal in a direction opposite that of the downstream signal along the output downstream transmission line;
(d) a first operational amplifier including a non-inverting input, an inverting input, and an output;
(e) a second operational amplifier including a non-inverting input, an inverting input, and an output, the outputs of the first and second operational amplifiers forming an output of the upstream signal;
(f) a first variable input resistor, having a resistance $R_B$, connected between the inverting input of the first operational amplifier and the input downstream transmission line;
(g) a second variable input resistor, having the resistance $R_B$, connected between the inverting input of the second operational amplifier and the input downstream transmission line; and
(h) a processor connected to read a first voltage between the first and second lines in the first portion and a second voltage between the first and second lines in the second portion, and in response to the first and second voltages, to adjust the resistance $R_0$ of the pair of variable serial resistors and the resistance $R_B$ of the first and second variable input resistors.

14. The circuit of claim 13, wherein the resistance $R_B$ is ten times the resistance $R_0$.

15. The circuit of claim 13, wherein the first variable input resistor is connected to the second line in the second portion and the second variable input resistor is connected to the first line in the second portion, further comprising:
(a) a third variable input resistor, having a resistance $R_A$, connected between the inverting input of the first operational amplifier and the first line in the first portion; and
(b) a fourth variable input resistor, having the resistance $R_A$, connected between the inverting input of the second operational amplifier and the second line in the first portion.

16. The circuit of claim 15, further comprising:
(a) a first feedback resistor connected between the output and the inverting input of the first operational amplifier; and (b) a second feedback resistor connected between the output and the inverting input of the second operational amplifier.

17. The circuit of claim 15, wherein the processor is connected to adjust the resistance $R_A$ of the third and fourth variable input resistors in response to the first and second voltages.

18. The circuit of claim 15, wherein the resistance $R_A$ is adjusted to equal approximately 2 $(R_0+R_B)$.

19. The circuit of claim 13, wherein the non-inverting inputs of the first and second operational amplifiers are grounded.

20. The circuit of claim 13, wherein the processor is adapted to divide the second voltage by the first voltage to obtain a measured ratio of the second voltage to the first voltage in at least one iteration and is adapted to store an optimal ratio of the second voltage to the first voltage and a predetermined error limit of the optimal ratio, such that if the measured ratio is without the predetermined error limit of the optimal ratio, the resistances $R_0$, $R_B$ and $R_A$ are changed by the processor within the iteration until the measured ratio is within the predetermined error limit of the optimal ratio.

21. The circuit of claim 13, wherein the processor is adapted to store a lookup table including a set of desired values of $R_0$, $R_B$ and $R_A$ for a predetermined optimal ratio of the second voltage to the first voltage, and is adapted to adjust the resistances $R_0$, $R_B$ and $R_A$ according to the set of desired values of $R_0$, $R_B$ and $R_A$.

22. The circuit of claim 13, further comprising:
(a) a first voltage sensor connected to measure the first voltage between the first and second lines in the first portion; and
(b) a second voltage sensor connected to measure the second voltage between the first and second lines in the second portion, the first and second voltage sensors connected to transmit the measured first and second voltages to the processor, respectively.

23. The circuit of claim 13, further comprising a transformer that couples the input downstream transmission line to the output downstream transmission line.

24. A method for impedance matching in a circuit that comprises an input downstream transmission line including a first portion and a second portion connected by a pair of variable serial resistors each having a resistance $R_0$, an output downstream transmission line coupled to the input downstream transmission line, and an upstream signal directing circuit including first and second variable input resistors each having a resistance $R_B$ and third and fourth variable input resistors each having a resistance $R_A$, the method comprising the steps of:
(a) measuring a first voltage between the first and second lines in the first portion of the input downstream transmission line;
(b) measuring a second voltage between the first and second lines in the second portion of the input downstream transmission line;
(c) dividing the second voltage by the first voltage to obtain a measured ratio of the second voltage to the first voltage;
(d) determining if the measured ratio is within a predetermined error limit of an optimal ratio; and
(e) adjusting the resistances $R_0$, $R_B$ and $R_A$ of the variable resistors if the measured ratio is without the predetermined error limit of the optimal ratio.

25. The method of claim 24, further comprising repeating steps (a) through (e) until the measured ratio is within the predetermined error limit of the optimal ratio.

26. The method of claim 24, wherein the adjusting of the resistances comprises the steps of:
(i) changing the resistance $R_0$ by an amount;
(ii) changing the resistances $R_B$ and $R_A$ according to predetermined relationships with $R_0$;
(iii) measuring the first voltage;
(iv) measuring the second voltage;
(v) dividing the second voltage by the first voltage to obtain a second measured ratio of the second voltage to the first voltage;
(vi) determining if the second measured ratio is within the predetermined error limit of the optimal ratio stored in the processor; and
(vii) repeating steps (i) through (vi) if the second measured ratio is without the predetermined error limit of the optimal ratio.

27. The method of claim 26, wherein the amount is a fixed increment.

28. The method of claim 26, wherein the amount is a fixed decrement.

29. The method of claim 26, wherein the resistance $R_B$ is changed according to the relationship $R_B=10R_0$ and the resistance $R_A$ is changed according to the relationship $R_A=2(R_0+R_B)$.

30. The method of claim 29, wherein the optimal ratio of the second voltage to the first voltage is $5/11$.

31. The method of claim 24, further comprising eliminating the upstream signal prior to the measuring of the first and second voltages.

32. A method for impedance matching in a circuit that comprises an input downstream transmission line including a first portion and a second portion connected by a pair of variable serial resistors each having a resistance $R_0$, an output downstream transmission line coupled to the input downstream transmission line, an upstream signal directing circuit including first and second variable input resistors each having a resistance $R_B$ and third and fourth variable resistors each having a resistance $R_A$, and a processor connected to adjust the resistances $R_0$, $R_B$ and $R_A$, the method comprising the steps of:
(a) determining desired values of the resistances $R_0$, $R_B$ and $R_A$ from a lookup table stored in the processor; and
(b) adjusting the resistances of the variable resistors according to the desired values of the resistances $R_0$, $R_B$ and $R_A$.

33. The method of claim 32, wherein the desired value of the resistance $R_B$ is ten times the desired value of the resistance $R_0$.

34. The method of claim 33, wherein the desired value of the resistance $R_A$ is twice the sum of the desired values of the resistances $R_0$ and $R_B$.

35. The method of claim 32, further comprising eliminating the upstream signal prior to the measuring of the first and second voltages.

36. An automatic impedance matching circuit for separating flow of upstream and downstream signals, comprising:
(a) an input downstream transmission line, divided into a first portion and a second portion, comprising a first line and a second line in each of the first and second portions, the input downstream transmission line adapted to convey a downstream signal;
(b) a pair of variable serial resistors, each having a resistance $R_0$, connected in series between the first and second portions of the first and second lines, respectively;

(c) an output downstream transmission line coupled to the second portion of the input downstream transmission line, the output downstream transmission line characterized by a line impedance $Z_L$ and adapted to convey an upstream signal in a direction opposite that of the downstream signal along the output downstream transmission line;

(d) a first operational amplifier including a non-inverting input, an inverting input, and an output;

(e) a second operational amplifier including a non-inverting input, an inverting input, and an output, the outputs of the first and second operational amplifiers forming an output of the upstream signal;

(f) a first variable input resistor, having a resistance $R_B$, connected between the inverting input of the first operational amplifier and the second line in the second portion;

(g) a second variable input resistor, having the resistance $R_B$, connected between the inverting input of the second operational amplifier and the first line in the second portion;

(h) a third variable input resistor, having a resistance $R_A$, connected between the inverting input of the first operational amplifier and the first line in the first portion;

(i) a fourth variable input resistor, having the resistance $R_A$, connected between the inverting input of the second operational amplifier and the second line in the first portion; and (j) a processor connected to read a first voltage between the first and second lines in the first portion and a second voltage between the first and second lines in the second portion, to obtain a measured ratio of the second voltage to the first voltage, and in response to the measured ratio, to adjust the resistance $R_0$ of the pair of variable serial resistors, the resistance $R_B$ of the first and second variable input resistors, and the resistance $R_A$ of the third and fourth variable input resistors such that the measured ratio is within a predetermined error limit of an optimal ratio.

37. The circuit of claim 36, wherein the resistance $R_B$ is ten times the resistance $R_0$ and the optimal ratio of the second voltage to the first voltage is 5/11.

38. The circuit of claim 36, further comprising:
(a) a first feedback resistor connected between the output and the inverting input of the first operational amplifier; and
(b) a second feedback resistor connected between the output and the inverting input of the second operational amplifier.

39. The circuit of claim 36, wherein the resistance $R_A$ is adjusted to equal approximately 2 $(R_0+R_B)$.

40. The circuit of claim 36, wherein the non-inverting inputs of the first and second operational amplifiers are grounded.

41. The circuit of claim 36, wherein the measured ratio of the second voltage to the first voltage is calculated by the processor in at least one iteration, and if the measured ratio is without the predetermined error limit of the optimal ratio, the resistances $R_0$, $R_B$ and $R_A$ are changed by the processor within the iteration until the measured ratio is within the predetermined error limit of the optimal ratio.

42. The circuit of claim 36, wherein the processor is adapted to store a lookup table including a set of desired values of $R_0$, $R_B$ and $R_A$ for the optimal ratio of the second voltage to the first voltage, and if the measured ratio is without the predetermined error limit of the optimal ratio, to adjust the resistances $R_0$, $R_B$ and $R_A$ according to the set of desired values of $R_0$, $R_B$ and $R_A$ such that the measured ratio is within the predetermined error limit of the optimal ratio.

43. The circuit of claim 36, further comprising:
(a) a first voltage sensor connected to measure the first voltage between the first and second lines in the first portion; and
(b) a second voltage sensor connected to measure the second voltage between the first and second lines in the second portion, the first and second voltage sensors connected to transmit the measured first and second voltages to the processor, respectively.

44. The circuit of claim 36, further comprising a transformer that couples the input downstream transmission line to the output downstream transmission line.

45. A circuit comprising:
(a) a receiver having an input;
(b) an input transmission line having first and second positions thereon, the input transmission line being coupled to the receiver input;
(c) a variable impedance coupled in the input transmission line between the first and the second positions;
(d) first and second voltage sensors coupled to the first and second positions of the input transmission line, respectively; and
(e) a controller having inputs coupled respectively to the first and second voltage sensors and an output coupled to the variable impedance.

46. The circuit for claim 45, wherein the variable impedance includes at least one variable serial resistor connected between the first and second positions on the input transmission line.

47. The circuit of claim 45, wherein the control circuit includes a processor connected to read from the first and second voltage sensors measuring first and second voltages at the first and second positions on the input transmission line, respectively, and in response to the measured first and second voltages, to adjust the variable impedance to a desired value.

48. The circuit of claim 45, further comprising an upstream signal directing circuit coupled to the input downstream transmission line, the upstream signal directing circuit including a plurality of variable input resistors.

49. The circuit of claim 48, wherein the upstream signal directing circuit further comprises a plurality of operational amplifiers connected to the plurality of variable input resistors.

50. The circuit of claim 49, wherein the plurality of operational amplifiers comprise:
(i) a first operational amplifier including a non-inverting input, an inverting input, and an output;
(ii) a second operational amplifier including a non-inverting input, an inverting input, and an output, the outputs of the first and second operational amplifiers forming an output of the upstream signal,
wherein the plurality of variable input resistors are connected between the operational amplifiers and the input transmission line.

51. The circuit of claim 50, wherein the plurality of variable input resistors comprise:
(i) first and second variable input resistors, each having a resistance $R_B$, connected between the inverting inputs of the first and second operational amplifiers and the second position on the input transmission line, respectively; and (ii) third and fourth variable input resistors, each having a resistance $R_A$, connected between the inverting inputs of the first and second operational amplifiers and the first position on the input transmission line, respectively.

52. The circuit of claim 51, further comprising:

(a) a first feedback resistor connected between the output and the inverting input of the first operational amplifier; and (b) a second feedback resistor connected between the output and the inverting input of the second operational amplifier.

53. The circuit of claim 45, wherein the control circuit comprises a processor coupled to read from the first and second voltage sensors first and second voltages at the first and second positions of the input transmission line, respectively, to obtain a measured ratio of the second voltage to the first voltage, and in response to the measured ratio, to adjust the variable impedance and the variable input resistor such that the measured ratio approaches an optimal ratio.

54. The circuit of claim 45, further comprising:

(a) an output transmission line connected to the receiver; and (b) a transformer that couples the input transmission line to the output transmission line.

55. A method of impedance matching in a circuit having a transmission line including first and second positions, the transmission line coupled to an input of a receiver, comprising the steps of:

(a) measuring first and second voltages at the first and second positions on the transmission line, respectively, the first and second positions being separated by a variable impedance; and (b) adjusting the variable impedance in response to the first and second voltages.

56. The method of claim 55, further comprising the steps of:

(a) dividing the second voltage by the first voltage to obtain a measured ratio of the second voltage to the first voltage; and (b) determining if the measured ratio is within a predetermined error limit of an optimal ratio.

57. The method of claim 56, wherein the step of adjusting the variable impedance comprises the steps of:

(i) adjusting the variable impedance by a fixed amount;

(ii) measuring the first and second voltages;

(iii) obtaining a second measured ratio of the second voltage to the first voltage;

(iv) determining if the second measured ratio is within the predetermined error limit of the optimal ratio; and (v) repeating steps (i) through (iv) if the second measured ratio is without the predetermined error limit of the optimal ratio.

* * * * *